US008040798B2

(12) United States Patent
Chandra et al.

(10) Patent No.: US 8,040,798 B2
(45) Date of Patent: Oct. 18, 2011

(54) DISCOVERING COMMUNICATION RULES IN A NETWORK TRACE

(75) Inventors: Ranveer Chandra, Kirkland, WA (US); Srikanth Kandula, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 260 days.

(21) Appl. No.: 12/238,233

(22) Filed: Sep. 25, 2008

(65) Prior Publication Data

US 2010/0074125 A1    Mar. 25, 2010

(51) Int. Cl.
*H04J 1/16*    (2006.01)
(52) U.S. Cl. .................................. 370/229; 370/252
(58) Field of Classification Search .................. 370/241, 370/252, 464, 474, 242, 229; 709/223, 224; 379/1.01, 32.01; 714/100, 1, 25, 37, 39
See application file for complete search history.

(56) References Cited

U.S. PATENT DOCUMENTS

| | | | |
|---|---|---|---|
| 7,269,647 B2 | 9/2007 | Chang et al. | |
| 7,385,924 B1 * | 6/2008 | Riddle | 370/235 |
| 2002/0023080 A1 * | 2/2002 | Uga et al. | 707/1 |
| 2004/0123155 A1 | 6/2004 | Etoh et al. | |
| 2005/0111460 A1 | 5/2005 | Sahita | |
| 2005/0147047 A1 * | 7/2005 | Monk | 370/241 |
| 2005/0216496 A1 * | 9/2005 | Chickering | 707/101 |
| 2005/0257267 A1 | 11/2005 | Williams et al. | |
| 2005/0265253 A1 * | 12/2005 | Swift et al. | 370/252 |
| 2005/0289219 A1 | 12/2005 | Nazzal | |
| 2006/0026681 A1 * | 2/2006 | Zakas | 726/22 |
| 2006/0164988 A1 * | 7/2006 | Mishra et al. | 370/235 |
| 2007/0064617 A1 | 3/2007 | Reves | |
| 2007/0226802 A1 * | 9/2007 | Gopalan et al. | 726/24 |
| 2007/0265713 A1 | 11/2007 | Veillette et al. | |
| 2009/0086651 A1 * | 4/2009 | Luft et al. | 370/253 |

OTHER PUBLICATIONS

Lee, et al. Data Mining Approaches for Intrusion Detection http://www1.cs.columbia.edu/~sal/hpapers/USENIX/usenix.html. Last accessed Jul. 4, 2008, 22 pages.
Pang, et al. The Devil and Packet Trace Anonymization. In: Computer Communication Review, Jan. 2006. http://www.icir.org/mallman/papers/devil-ccr-jan06.pdf. Last accessed Jul. 4, 2008, 10 pages.
Meng, et al. Automatic Profiling of Network Event Sequences: Algorithm and Applications http://www.cs.ucla.edu/~xqmeng/paper/infocom08.pdf. Last accessed Jul. 4, 2008, 9 pages.
Wright, et al. Defending Anonymous Communications against Passive Logging Attacks. In: Proceedings of the Symposium on Security and Privacy (SP'03), 1081-6011/03 IEEE. http://ieeexplore.ieee.org/iel5/8543/27002/01199325.pdf?tp=&amumber=1199325&isnumber=27002. Last accessed Jul. 4, 2008, 14 pages.

(Continued)

*Primary Examiner* — Kwang B Yao
*Assistant Examiner* — Obaidul Huq
(74) *Attorney, Agent, or Firm* — Lee & Hayes, PLLC

(57) ABSTRACT

The claimed subject matter provides a system and/or a method that facilitates managing a network by mining a communication rule. An analysis engine can employ a packet trace within a network in order to provide timing information, wherein the network includes at least one of a host, a protocol, or an application. A traffic evaluator can extract a communication rule for the network based upon an activity matrix generated from the timing information in which the activity matrix includes at least one of a row of a time window for the packet trace and a column for a flow in the packet trace.

20 Claims, 10 Drawing Sheets

OTHER PUBLICATIONS

Pang, et al. A High-Level Programming Environment for Packet Trace Anonymization and Transformation. In: SIGCOMM'03, Aug. 25-29, 2003, Karlsruhe, Germany. ACM 1-58113-735-4/03/0008. http://www.sigcomm.org/sigcomm2003/papers/p339-pang.pdf. Last accessed Jul. 4, 2008, 13 pages.

Analysis of the Sapphire Worm. Modified Feb. 12, 2007 http://www.caida.org/research/security/sapphire/. Last accessed Jul. 4, 2008, 2 pages.

Estan, et al. Automatically Inferring Patterns of Resource Consumption in Network Traffic. In: SIGCOMM'03, Aug. 25-29, 2003, Karlsruhe, Germany. ACM 1-58113-735-4/03/0008. http://www.cs.ucsd.edu/~cestan/papers/p0403-estan.pdf. Last accessed Jul. 4, 2008, 12 pages.

Karagiannis, et al. BLINC: Multilevel Traffic Classification in the Dark. SIGCOMM'05, Aug. 21-26, 2005, Philadelphia, Pennsylvania, USA. ACM 1595930094/05/0008 http://research.microsoft.com/~thomkar/papers/BLINC.pdf. Last accessed Jul. 4, 2008, 12 pages.

Paxon, et al. Bro: A System for Detecting Network Intruders in Real-Time. Revised Jan. 14, 1998. In: Proceedings of the 7th USENIX Security Symposium, San Antonio, TX, Jan. 1998. http://www.ece.cmu.edu/~adrian/731-sp04/readings/paxson99-bro.pdf. Last accessed Jul. 4, 2008, 18 pages.

Zhang, et al. Detecting Stepping Stones. In: Proceedings of the 9th USENIX Security Symposium, Denver, Colorado, Aug. 2000. http://www.cs.utah.edu/classes/cs6935/papers/stepping.pdf. Last accessed Jul. 4, 2008, 11 pages.

Yoda, et al. Finding a Connection Chain for Tracing Intruders. http://www.trl.ibm.com/projects/security/chaintrace/ye00.pdf. Last accessed Jul. 4, 2008, 15 pages.

Plonka. FlowScan: A Network Traffic Flow Reporting and Visualization Tool. pp. 305-317 of the Proceedings. http://www.usenix.org/events/lisa00/full_papers/plonka/plonka_html/index.html. Last accessed Jul. 4, 2008, 19 pages.

GAIM/Pidgin. http://www.pidgin.im/. Last accessed Jul. 4, 2008, 1 page.

GrIDS: A Graph-Based Intrusion Detection System for Large Networks, Jan. 26, 1999 http://209.85.175.104/search?q=cache:fDosk3SHaGYJ:seclab.cs.ucdavis.edu/projects/arpa/grids/grids.pdf+Grids:+A+graph-based+intrusion+detection+system+for+large+networks&hl=en&ct=clnk&cd=3&gl=us. Last accessed Jul. 4, 2008, 28 pages.

Staniford-Chen, et al. Holding Intruders Accountable on the Internet. 1081-6011/95 IEEE http://ieeexplore.ieee.org/iel2/3181/9013/00398921.pdf?tp=&arnumber=398921&isnumber=9013. Last accessed Jul. 4, 2008, 11 pages.

Gibson. IDENT ShieldsUp, Port Authority Edition—Internet Vulnerability Profiling http://www.grc.com/port_20113.htm. Last accessed Jul. 4, 2008 1 page.

IPMON. Academic Research Group, Jul. 2, 2008, Proceedings of IEEE ICC 2008. http://ipmon.sprintlabs.com. Last accessed Jul. 4, 2008, 1 page.

Posey. An Overview of Link-Level Multicast Name Resolution. Published: Nov. 29, 2006. http://www.windowsnetworking.com/articles_tutorials/Overview-Link-Local-Multicast-Name-Resolution. Last accessed Jul. 4, 2008, 3 pages.

Oetiker. Multi Router Traffic Grapher. Last Update: Jan 23, 2008. http://people.ee.ethz.ch/oetiker/webtools/mrtg/. Last accessed Jul. 4, 2008, 3 pages.

Mills. Network Time Protocol. RFC 1305, Version 3. Mar. 1992. http://www.faqs.org/rfcs/rfc1305.html. Last accessed Jul. 4, 2008, 108 pages.

Venkataraman, et al. New Streaming Algorithms for Fast Detection of Superspreaders. http://www.cs.berkeley.edu/~dawnsong/papers/superspreader.pdf. Last accessed Jul. 4, 2008, 18 pages.

Port 1081. http://isc.incidents.org/port.html?port=1081. Last accessed Jul. 4, 2008, 18 pages.

PortPeeker Capture of mySQL Bot Attack. http://www.linklogger.com/mySQLAttack.htm. Last accessed Jul. 4, 2008, 10 pages.

Kannan, et al. Semi-Automated Discovery of Application Session Structure. IMC'06, Oct. 25-27, 2006, Rio de Janeiro, Brazil. ACM 1595935614/06/0010. http://www.imconf.net/imc-2006/papers/p12-kannan.pdf. Last accessed Jul. 4, 2008, 13 pages.

Dingledine, et al. Tor: The second-Generation Onion Router. http://www.torproject.org/tor-design.pdf. Last accessed Jul. 4, 2008, 17 pages.

Bahl, et al. Towards Highly Reliable Enterprise Network Services via Inference of Multi-Level Dependencies. SIGCOMM'07, Aug. 27-31, 2007, Kyoto, Japan. ACM 978-1-59593-713-1/07/0008. http://research.microsoft.com/~mzh/sherlock.pdf. Last accessed Jul. 4, 2008, 12 pages.

\* cited by examiner

DISCOVERING COMMUNICATION RULES IN A NETWORK TRACE

BACKGROUND

Enterprises typically use traffic analysis tools that focus on traffic volume. Such tools identify the heavy hitters (e.g., flows that exchange lots of data, etc.), yet fail to identify the structure implicit in network traffic—do certain flows happen before, after or along with each other repeatedly over time? Since most traffic is generated by applications (e.g., web browsing, email, p2p), network traffic tends to be governed by a set of underlying rules. Malicious traffic, such as bot scans, e.g., low volume probes for vulnerable machines, also presents distinct patterns in traffic.

In light of the above and the ever-increasing amounts of data, networks and/or enterprises can be increasingly complex to manage, evaluate, and/or troubleshoot. For example, networks (e.g., enterprise networks, educational networks, etc.) can be built from multiple applications, protocols, servers, etc. which interact in unpredictable ways. Once a network is set-up, administrative tracking of the network is overwhelming. For instance, configuration errors can seep in, software upgrades happen or servers may be phased out. These are just a few occurrences that make the management of networks and evaluating traffic challenging. Conventional techniques, such as scripting cron jobs and correlating server logs, are tedious and do not scale appropriately.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate identifying underlying rules that govern communications over a network in order to provide network monitoring, diagnosis, and intrusion detection. A traffic evaluator can leverage packet trace data related to a network in order to create a communication rule. The communication rule can be utilized to evaluate network traffic, detect configuration errors within the network, and/or detect malicious activity within the network. In general, the communication rules generated by the traffic evaluator can be utilized to evaluate traffic that spans across multiple hosts, protocols, and/or applications. Significant rules involving flow pairs are extracted from the packet trace without needing any prior information on which rules to mine for. Further, templates are used to abstract parts of flows such that rules that are not obvious when looking at the raw traces are revealed.

Furthermore, the traffic evaluator can dynamically generate communication rules for the particular network based at least in part upon packet trace data received in real time. In other words, the subject innovation can enable dynamic network management associated with network monitoring, diagnosis, and intrusion detection. Moreover, the subject innovation can be implemented in legacy networks as well as in current or future networks because the subject innovation makes minimal assumptions in extracting rules.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
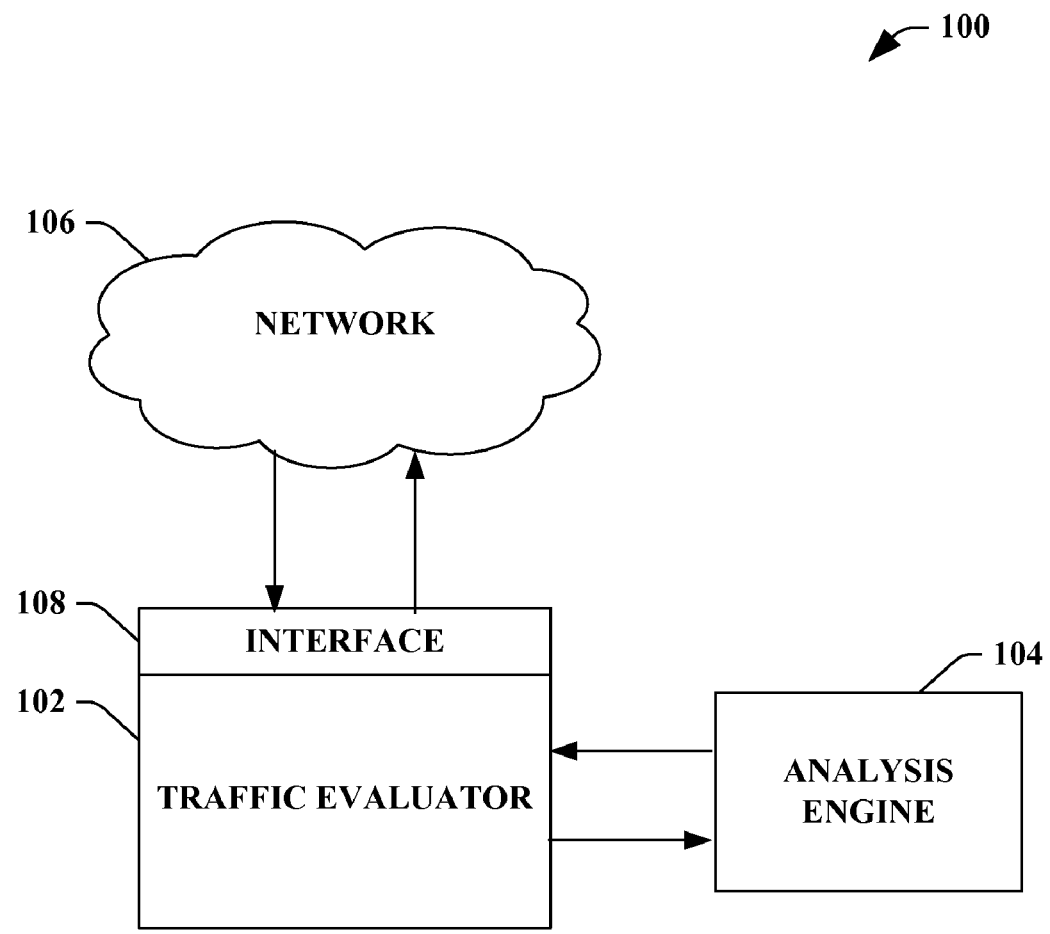
FIG. 1 illustrates a block diagram of an exemplary system that facilitates identifying underlying rules that govern communications over a network in order to provide network monitoring, diagnosis, and intrusion detection.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "evaluator," "network," "identifier," "generator," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates identifying underlying rules that govern communications over a network in order to provide network monitoring, diagnosis, and intrusion detection. The system 100 can include a traffic evaluator 102 that can create a communication rule which can be employed to manage a network 106 (e.g., an edge network, an enterprise network, an educational network, etc.). In particular, the communication rules can be utilized for network management which can include, but not limited to, network monitoring, diagnosis, intrusion detection, application or software monitoring, application or software misconfiguration, error detection in application or software, etc. Moreover, the communication rules can be created based at least in part upon a portion of packet timing information, wherein the packet timing information can be gleaned from a packet trace implemented by an analysis engine 104.

The traffic evaluator can provide a technique that identifies one or more underlying rules that can govern communications over the network 106. For instance, the traffic evaluator 102 can generate a communication rule from packet trace information, wherein the communication rule can be, but is not limited to being, an AFS client connects to the root server to figure out which volume server stores the file it needs, before fetching the file from the appropriate volume server, a client connects to a tracker periodically before connecting to new peers, HTTP→DNS, etc. By utilizing packet timing information, the traffic evaluator 102 can build rules for network communication that can be spread across multiple hosts, protocols, and/or applications. The traffic evaluator 102 can provide a statistical rule mining technique that can extract significant communication patterns from a packet trace provided by the analysis engine 104. Moreover, the communication patterns can be identified without explicitly being instructed or informed on which portions of information to examine. The traffic evaluator 102 can employ a template to systematically abstract parts of a network flow thereby capturing rules that are otherwise unidentifiable.

The traffic evaluator 102 can evaluate packets on the wire in connection with the network 106. The correlation component 104 can help the traffic evaluator 102 to create communication rules that underlie a majority of user activities from a network trace. This broad approach to search for rules can enable the identification of rules for at least one of these; traffic of major applications in the network configuration errors, unwarranted communications, malicious activity, etc.

Generally, the traffic evaluator 102 extracts rules that govern communication within the network 106. For example, a communication rule can be an implies relationship such as $Flow_i.new \Rightarrow Flow_j.new$ indicating that whenever a $Flow_i$ connection happens, a new $Flow_j$ connection is likely to happen. It is to be appreciated that a flow can be a five-tuple <local IP, local port, remote IP, remote port, protocol>; a flow activity can be a either absent, present, or new (e.g., note new ⊂ present); a Rule X⇒Y can be X, Y are tuples of <flow, flow_activity>, wherein X⇒Y is a rule if whenever flow $F_x$ has activity $A_x$, flow $F_y$ is very likely to have activity Ay; and an activity matrix can include rows that denote timing windows in which columns can denote flows in the trace and each entry can hold the activity of a flow (e.g., column) in the corresponding time window (e.g., row). The traffic evaluator 102 can provide an analysis technique that can automatically extract significant communication rules in the network 104. For instance, the traffic evaluator 102 can deduce communication rules such as, but not limited to, a DNS connection often precedes new connections, an AFS client first talks to the root-server (e.g., port 7003) before picking up files from the appropriate volume-servers (e.g., port 7000), an End-Point-Mapper RPC call precedes mail from a mail server, viruses flood the entire network looking for vulnerable servers, etc.

In addition, the system 100 can include any suitable and/or necessary interface component (herein referred to as the "interface 108"), which provides various adapters, connectors, channels, communication paths, etc. to integrate the traffic evaluator 102 into virtually any operating and/or database system(s) and/or with one another. In addition, the interface component can provide various adapters, connectors, channels, communication paths, etc., that provide for interaction with the traffic evaluator 102, the analysis engine 104, the network 106, and any other device and/or component associated with the system 100.

Figure 2:
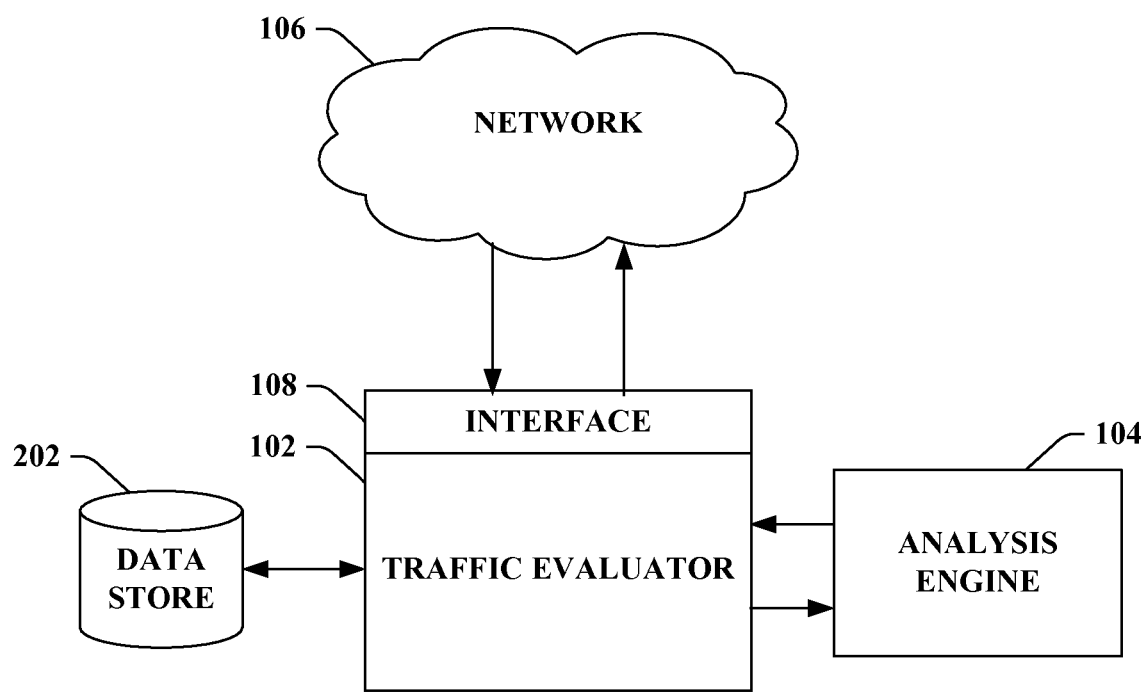
FIG. 2 illustrates a block diagram of an exemplary system that facilitates utilizing a packet trace within a network to create a rule to evaluate packet flow and traffic with the network.

FIG. 2 illustrates a system 200 that facilitates utilizing a packet trace within a network to create a rule to evaluate packet flow and traffic with the network. The system 200 can include the traffic evaluator 102 that can create a communication rule for evaluation of the network 106 based at least in part upon packet timing information. The traffic evaluator 102 can extract communication rules without configuration (e.g., without instructions on what data to identify or locate, etc.). In other words, the traffic evaluator 102 can identify communication rules that are unknown such as, but not limited to, configuration errors, anomalies, exploits, etc. The system 200 can further provide a broad set of communication rules for the patterns followed by a majority of the network traffic even when such dependencies spread across multiple applications, servers, protocols, etc. Moreover, the traffic evaluator 102 can be extensible and adaptable to evolving networks. For instance, the traffic evaluator 102 can make minimal assumptions in regards to applications, protocols, servers, etc. within the network 106 which can enable universal extensibility to future networks or modifications to the network 106.

For instance, as a potential approach, if a group of flows consistently occur together and repeat this co-occurrence over long periods of time, it is likely that the group is dependent. Yet, correlation does not directly translate to dependence. The system 200 can selectively bias the potential rules it evaluates and does not evaluate rule types that are unlikely to yield useful information. Second, the traffic evaluator 102 can abstract away extraneous flow details to make useful patterns more discernible. Third, the traffic evaluator 102 can employ an appropriate statistical measure to score the candidate rules and mines efficiently. Finally, the traffic evaluator 102 can aggregate the discovered rules into a small number of useful patterns that an administrator can corroborate and use. Not all dependencies are visible at the granularity of a flow. For example, suppose whenever a client talks to a sales server, the server fetches data from a backend database. Yet none of the clients access the server often enough so a significant rule is not generated. To capture such rules that are otherwise unidentifiable, the system 200 can introduce templates that systematically abstract away parts of flows. For example, a template can replace the client's IP address with a wild-card character creating a generic whenever any client talks to the sales server. Leveraging these generics, the traffic evaluator 102 can search for rules like *:Sales=>Sales:Database, meaning whenever any one of the clients talks to the Sales server, the Sales server talks to its Database. It is to be appreciated that these templates can be applied without any prior knowledge about the hosts involved in the trace and by incorporating these templates, the expressiveness of rules increases considerably.

The traffic evaluator 102 can be implemented on server-facing links of the network 106, on access-links (e.g., Internet facing links) or on network bottlenecks (e.g., connections from branch office to corporate) among other locations. Further, the traffic evaluator can also be implemented to feed off packet traces collected at any of the above network locations. In general, the system 200 can discover communication rules for applications such as, but not limited to, email, web, file-servers, instant messengers, planet lab slices, multimedia distribution within the network 106, etc. The traffic evaluator 102 can detect configuration errors leading to bug fixes in the network 106. Moreover, the traffic evaluator 102 can detect malicious traffic, machines infected by viruses (e.g., trojan virus, etc.), mysql bot scans, SSH scans targeting key routers, etc. The traffic evaluator 102 can also identify protocols that may be deployed and utilized in operating systems but are not previously known to the traffic evaluator or the operator such as, but not limited to, link-level multicast name resolution, etc.

The system 200 can further include a data store 202 that can include any suitable data utilized and/or accessed by the traffic evaluator 102, the analysis engine 104, the network 106, the interface 108, etc. For example, the data store 204 can include, but is not limited to including, packet trace information, communication rules, network information (e.g., applications, machines, routers, device information, etc.), scoring/ranking data for communication rules, administrator settings, user preferences, security settings, configuration logs, flow information, etc. Moreover, although the data store 202 is depicted as a stand-alone component, it is to be appreciated that the data store 202 can be a stand-alone component, incorporated into the traffic evaluator 102, the analysis engine 104, the network 106, the interface 108, and/or any suitable combination thereof.

It is to be appreciated that the data store 202 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 204 of the subject systems and methods is intended to comprise, without being limited to, these and any other suitable types of memory. In addition, it is to be appreciated that the data store 202 can be a server, a database, a hard drive, a pen drive, an external hard drive, a portable hard drive, and the like.

Figure 3:
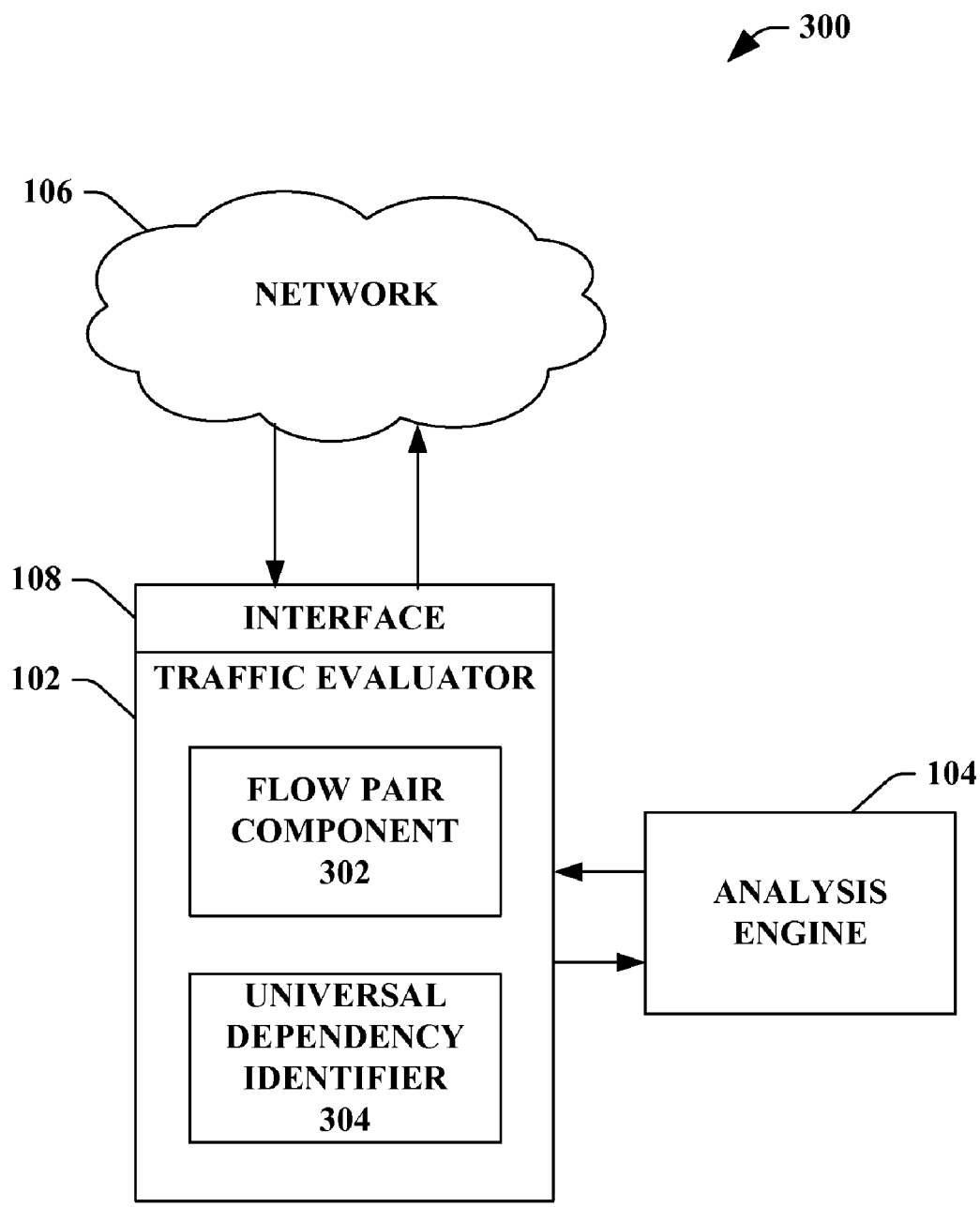
FIG. 3 illustrates a block diagram of an exemplary system that facilitates identifying and evaluating flow activities and related dependencies within a network.

FIG. 3 illustrates a system 300 that facilitates identifying and evaluating flow activities and related dependencies within a network. The system 300 can include the traffic evaluator 102 that can generate a communication rule for evaluation of the network 106, wherein the communication rule can be created based at least in part upon packet trace data employed by the analysis engine 104. The system 300 can discover communication rules inside the network 106 given a packet trace via the analysis engine 104. A communication rule can be a dependency between flow activities. For example, a communication rule X=>Y occurs in the trace if flow activity X implies flow activity Y. For instance, X may be a new http connection from a client to a web-server, which implies Y, a new connection from the client to the DNS server. The rules can be probabilistic to mimic the underlying phenomena, for example, since a new connection can trigger DNS lookups only upon a miss in the local cache. Some communication rules can be at the granularity of flows such as whenever Host1 talks to a Host2, Host2 talks to Host3, whereas others can be more generic such as whenever any client talks to the web-server W, the web-server talks to a backend B (e.g., generic rules, created by generic rule templates, etc.). The system 300 can further discover significant instantiations of these templates in the given packet trace for the network 106. Discovered rules can describe the normal behavior of the network 106 while others can identify attacks and miss-configurations in the network 106.

The system 300 can include a flow pair component 302 that can identify correlated occurrences from flow dependencies in the trace. The flow pair component 302 can identify flow groups that co-occur with frequency significantly greater than chance and repeat consistently over long periods of time.

For a scalable solution, the flow pair component 302 can employ a Markovian assumption. Whether a flow is absent, present, or new at any point of time can be influenced by flows that have recently occurred. In other words, the trace can be partitioned into time windows, wherein dependencies are identified that occur within the same time window (e.g., default window size is 1 second, etc.). This can focus on identifying dependencies that are separated by a short period of time. It is to be appreciated that network dependencies can be machine-generated and are separated by a short period of time. For example, looking within 1 s-wide windows can create the communication rules for BitTorrent, viruses and, email clients. It is to be appreciated that the system 300 can be utilized with flow dependencies that are longer periods. For example, the gap between a user reading a web-page and clicking on a link is relatively long. In other words, the subject innovation techniques can be extended to look at dependencies over multiple time windows.

Using this Markovian assumption, the flow pair component 302 can convert the input trace into an activity matrix (discussed in more detail below). It is to be appreciated that an activity matrix can consist of, but is not limited to, rows that denote timing windows, columns that denote flows in the trace and entries that hold the activity of a flow (e.g., column) in the corresponding time window (e.g., row). Each entry in the matrix may take one of three values: new, present, or absent, representing the activity of the flow corresponding to the column in the time window corresponding to the row. It should be appreciated that this representation is typical of a data-mining problem, hence the system 300 can find dependent flows by employing a data-mining technique, such as mining for association rules, on top of the activity matrix.

The flow pair component 302 can identify a flow in terms of its source and destination IPs, ports, and protocol. A flow is present in a time-window if it sends non-zero packets during that period. For connection-oriented flows like TCP that have an explicit beginning and end (syn, fin), a flow is new in the time window that overlaps its beginning. For datagram-based flows and also when traces that do not have detailed headers, a flow is new if it becomes present after a period of inactivity (e.g., which defaults to no packets in the previous five time windows). Note that if a flow is new, it is also present in that time window (new $\subset$ present).

The flow pair component 302 can identify the significance of a communication rule once discovered. The flow pair component 302 can employ an information-theoretic approach to identify statistically significant dependencies—pairs of flows that have much higher joint probabilities than merely due to chance. Specifically, candidate rules of the type X=>Y can be set up, where both X and Y are tuples of <flow, flow-activity>. The following JMeasure can be utilized (or other metrics from the data-mining community) to score candidate rules:

$$\text{JMeasure}(X \Rightarrow Y) = I(Y; X=1),$$

where I(Y; X=1) is the mutual information, i.e.:

$$I(Y; X = 1) = P(X \wedge Y)\log\frac{P(Y \mid X)}{P(Y)} + P(X \wedge \neg Y)\log\frac{P(\neg Y \mid X)}{P(\neg Y)}$$

The JMeasure score of rule X=>Y is the reduction in entropy of the random variable Y when the random variable X happens. If X and Y were independent, the JMeasure score would be zero. At the other extreme, if Y were completely dependent on X, the JMeasure takes the largest possible value, P(X) log 1/(P(Y)). Note that the JMeasure score can encode the directionality of the relationship. It should be noted that other statistical scoring functions might be used besides JMeasure.

It should be appreciated that data-mining metrics are not necessarily appropriate for mining in network traces; hence significant tuning of scoring metric so as to make it applicable in this domain may be required. In particular, such tuning may be necessary to deal with long-running flows, negative correlations and scalability problems as discussed below, but may not be limited to just these phenomena.

Reduction in entropy can occur in one of two ways. In the extreme, when X happens, Y may always happen or Y may never happen. Unfortunately, JMeasure does not differentiate between these two cases and scores both highly. While the first type of rules are interesting as such rules can correspond to co-occurring flows which are likely to be true dependencies, the latter kind happen trivially often in network traces and are generally not meaningful. There are so many flows that are much shorter than the duration of the trace (low P(Y)) that it is easy to find another flow X that happens only when Y does not, spuriously leading to a high JMeasure rule. To avoid such rules, the positive correlation part of the JMeasure rule can be utilized:

$$\text{Score}(X \Rightarrow Y) = P(X \wedge Y)\log\frac{P(Y \mid X)}{P(Y)}.$$

Long-duration flows can pose an interesting challenge unique to mining network traces. Traces may contain flows that are contiguously active over a significant part of the trace (e.g., long downloads (FTP, SMB), long-running shell sessions, telnet, ssh, remote-desktop, etc. Given the prevalence of short duration flows, it is often the case that a short flow (X) happens only when a long running flow (Y) is active. The above scoring technique scores this pair highly, yielding a spurious rule. To avoid such rules the flow pair component 302 can employ the following principles. First, spurious rules like the above are noted to happen when the activity on either side (both X and Y) is present. Long-running flows are present in many more time-windows than they are new, and a short flow that starts many times, i.e., has many new time-windows, is unlikely to completely coincide with a long flow. Rules involving present activities are reported when there is little mismatch between the frequencies on either side, for e.g., ⅓≦[P(X)/P(Y)]≦3. Second, rules involving flows that happen in more than 90% of the time-windows of the trace are not reported (e.g., dominant flows may be filtered).

In network mining there is an additional challenge. There are so many flows, and so many potential rules. The flow pair component 302 can filter flows and/or rules based on a score or ranking. In other words, the flow pair component 302 can provide optimizations that can be described herein. The flow pair component 302 can bias the possible rules considered in order to reduce false positives. First, it is noted that a rule involving two flows can have up to four unique Internet Protocols (IPs)—the sources and destinations of the two flows. It is unlikely that flows that have none of their ends in common are dependent (example: does IP A talk to IP B whenever IP C talks to IP D?). Hence, rules involving flows that have at-least one IP address in common can be reported. Not only does this reduce the number of potential rules, but it also shifts focus away from potential rules that are more likely to be false-positives. Second, most flows can happen in such few time windows that there is too little data to predict relationships for such short flows. So, instead, the flow pair component 302 can focus on the heavy tail—the K most active flows in the packet trace. K can be set (e.g., by the network administrator, user, etc.), otherwise it can default to 5000 flows. It is to be appreciated that the above optimizations can be eliminated with a much more powerful machine to handle such calculations, etc.

In one example, the system 300 can report rules that have a significance score greater than a threshold, typically 0.01 nats (e.g., nats stands for units of entropy when natural logarithms are used, e.g., log (2)=693 nats). To put this threshold in perspective, a large score can be 0.367 nats. This can happen, when both X, and Y have a 36.8% chance of happening by themselves, but always happen together. On the other hand, if Y is quite frequent, say it happens 80% of the time, and X is relatively rare say it happens 10% of the time, but Y is dependent on X meaning Y always happens whenever X happens, the JMeasure score for X=>Y would be 0.0223 nats. We note that this network mining technique described above includes at least one of the following: basic statistics/data mining techniques, coupled with heuristics that take into account networking issues, coupled with optimizations to make mining feasible given hardware and/or software constraints, etc.

The system 300 can further include a universal dependency identifier 304 that can identify a generic communication rule based upon evaluation of a packet trace related to the network 106. For example, suppose whenever a client talks to a server, the server fetches data from a backend database. Clearly this is an important dependency, yet it may be missed if none of the clients access the server frequently (e.g., based upon treatment of short flows). The universal dependency identifier 304 can relax the granularity at which dependencies are identified. In particular, the universal dependency identifier 304 can report the above dependence as long as all the clients together access the server often enough. Such rules identified in this manner by the universal dependency identifier 304 can be defined as generic rules. For instance, the idea behind generics can be substantially similar to wild-cards in regular expression matching—relax some of the fields in a flow's five-tuple. As an example, whenever the flow Client.SomePort:Sales.80 is active in a time window, the generic *.*:Sales.80 can be introduced as being active in that time window. Further, the following rules can be considered: *.*:Sales.80=>Sales.*:Database.* which can be defined as this rule happens whenever some client talks to Sales and Sales talks to the Database within the same time window. A more interesting example of a generic rule is: *.*:WebServer.80=>*.*:DNS.53. For rules that relax IPs on both sides, the rule can happen in a time window only if the missing fields on both sides are the same. It is to be appreciated that it does not matter which client(s) lead to the two relaxed flows, as long as there is at least one client that talked to both the web-server and the DNS in that time-window.

The universal dependency identifier 304 can define templates for relaxing flows and for combining the generics into rules. Whenever a flow matches a relaxation template, the corresponding generic can be instantiated by the universal dependency identifier 304. Rule templates can prescribe which combinations of generics and flows are to be considered as a communication rule. The subject innovation can provide a relaxation template and at least two rule templates. It is to be appreciated that the system 300 can automatically learn significant rules that are formed through instantiations of these templates in the packet trace.

The universal dependency identifier 304 can provide a relaxation template to create generics. Whenever one end of a flow is a known port (e.g., 80 for http, 53 for DNS, services, etc.), the IP at the opposite (client) end can be allowed to be relaxed. The idea is to relax the client's IP while keeping the server's IP intact. Besides the standard list of server ports, ports that are used by a large number of flows in the trace are considered as known. This can encompass most of the ports used by peer-to-peer applications. Further, ports that are not in the known list can be considered to be substantially similar for the purpose of matching.

Moreover, the universal dependency identifier 304 can provide a rule template to combine generics and flows. A ServerBackend template can focus on identifying a server's backend dependencies (e.g., see *.*:Sales.80=>Sales.*:Database.*). This template can allow rules that combine a flow with a generic if the un-relaxed IP in the generic (e.g., the IP corresponding to the server) matches one of the IPs in the flow. A Client-Frontend template can focus on dependencies that a client notices (e.g., *.*:WebServer.80=>*.*:DNS.53). This template can allow rules involving two generics. Such a rule can be active in a time window if at-least one client accesses both the server IPs/Ports in that time window.

Rules involving generics can become more interesting as more unique clients conform to the rule. Hence, a support metric can be utilized to supplement statistical significance. The support of a rule involving one or more generics can be the number of unique clients whose communication can be abstracted in the form of the rule. Clearly, a generic rule with support 1 is a trivial generalization. Hence, in one example, a generic rule that have a support >3 can be reported.

Figure 4:
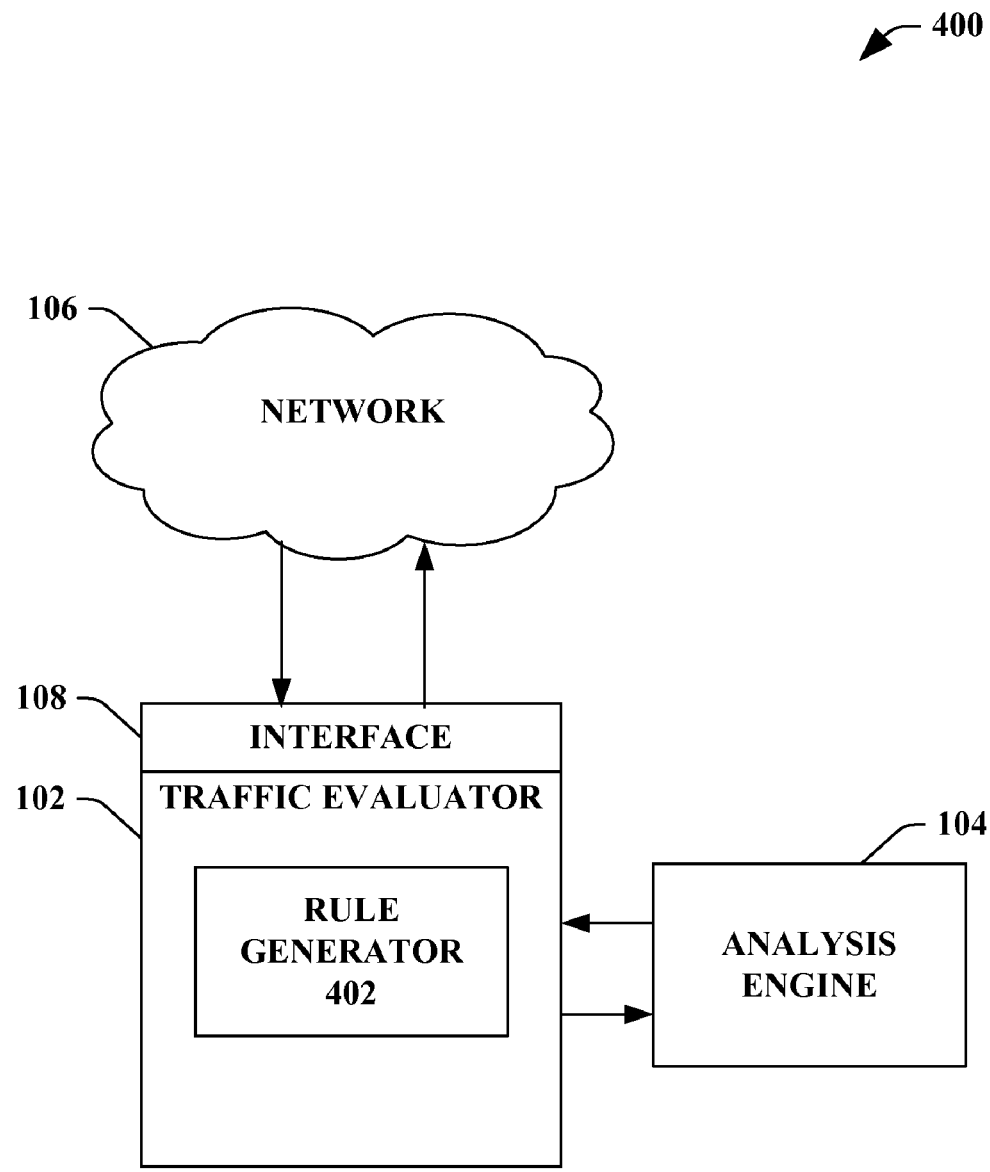
FIG. 4 illustrates a block diagram of an exemplary system that facilitates generating a communication rule based upon a packet trace within a network.

FIG. 4 illustrates a system 400 that facilitates generating a communication rule based upon a packet trace within a network. The system 400 can include a rule generator 402 that can employ an algorithm in order to generate at least one communication rule based at least in part upon examination of a packet trace for the network 106. In other words, the rule generator 402 can mine for a communication rule which can apply for the network 106 (e.g., flows, dependencies, activity, etc.).

It is to be appreciated that the costliest part of rule-mining can be computation of how often each candidate rule happens in the trace. If the rule only involves normal flows, then the time-windows can be counted when both these flows happen; if the rule involves generics, and then time windows that contain flows matching the generics can be counted as described above.

The rule generator 402 can compute frequencies efficiently for potential rules. Recall that the system 400 can utilize the top K active flows (and generics) after filtering or discarding long flows (e.g., those that happen in more than 90% of the time windows). Suppose the trace consists of W consecutive time windows. Naively checking whether each of the $O(K^2)$ pairs of flows occur in each of the time-windows, takes $O(W*K^2)$ time. The square term, $K^2$, can dominate the running time and can be quite long. Instead, the rule generator 402 can observe that in any time-window only a handful of the K flows are active. The rule generator 402 can count flow pairs that are active in a time window. If the $w^{th}$ window has $S_w$ flows, the rule generator 402 can utilize an algorithm that computes frequencies for all rules in $$O\left(\sum_{w=1}^{W} S_w^2\right)$$

time. For concreteness, the following pseudo-code can be implemented for the algorithm:

```
Procedure 1 ExtractCommRules(Packet Trace)
 1: Find F - the set of top K active flows and generics
 2: Compute Activity Matrix M for all flows in F
 3: Use Rule Templates to Create Candidate Rule set R
 4: for all Windows w 2 rows (M) do
 5:     Let X, Y be <flow, activity> tuples in window w
 6:     for all Pairs X, Y ∈ Window w do
 7:         if X => Y ∈ Candidate Rules R then
 8:             UpdateStats Freq(X => Y )
 9:         end if
10:     end for
11: end for
12: for all X => Y rules in Candidate Rules R do
13:     if Score(X => Y ) > α, Support(X => Y ) > 3 then
14:         Output SignificantRule X => Y
15:     end if
16: end for
```

The rule generator 402 can utilize an algorithm and statistical significance score that can naturally extend to rules involving more than two flows. To see this, note that if the left side of the rule X=>Y were to be replaced with a conjunction $X_1\char`\^X_2\char`\^\ldots\char`\^X_n$=>Y both the algorithm and the significance score can still apply. The trade-off can be computational complexity versus rule exhaustiveness. Looking for rules involving up to N flows would roughly take $O(W*K^N)$ time. On the other hand, doing so would help when a set of flows are related but none of the pair-wise relationships are significant; for e.g., say $F_3$ is present only when both $F_1$ is new and $F_2$ is present and never otherwise. Here, $F_1$.new$\char`\^F_2$.present=>$F_3$.present is a significant rule but neither of the pair-wise rules are significant enough. As a potential tradeoff between computation and expressiveness, the rule generator 402 can follow Occam's razor, wherein the more complicated a rule, the less likely it would happen; hence pair-wise rules are focused upon.

The rule generator 402 can further provide grouping of communication rules. The rule generator 402 can cluster similar rules into easier-to-understand groups. A first technique is to consider each rule as a directed edge between the two flow-activities in the rule (e.g., X=>Y is treated as a directed link from a node X to node Y). The result can be a rule graph. The rule generator 402 can take a transitive closure of the rule-graph to identify clusters of rules that involve related flows, for e.g., X=>Y1, X=>Y2, Y1=>Z will belong to the same transitive closure. A second technique can be motivated by the observation that the rule graph consists of highly clustered components that are connected by "weak" edges, (e.g., rules with low statistical significance).

The rule-graph can be spectrally partitioned in order to remove such weak edges between strongly connected components. In general, if A is the adjacency matrix of the rule-graph, where each matrix entry is the significance score of the corresponding rule, the graph can be recursively partitioned based on the second smallest eigenvalue of A's Laplacian. The following pseudo-code can be utilized to spectrally partition the rule graph:

```
Procedure 2 RecursiveSpectralPartition(RuleGraph A)
1: if dim(A) < 10 or A is tightlyConnected then return
2: end if
3: Laplacian L = diag(colSums(A)) − A
4: Find EigenVector v for 2nd smallest eigen value of L
5: Split A's rows based on the sign of v into A_pos, A_neg
6: Recursively SpectralPartition A_pos and A_neg
```

Figure 5:
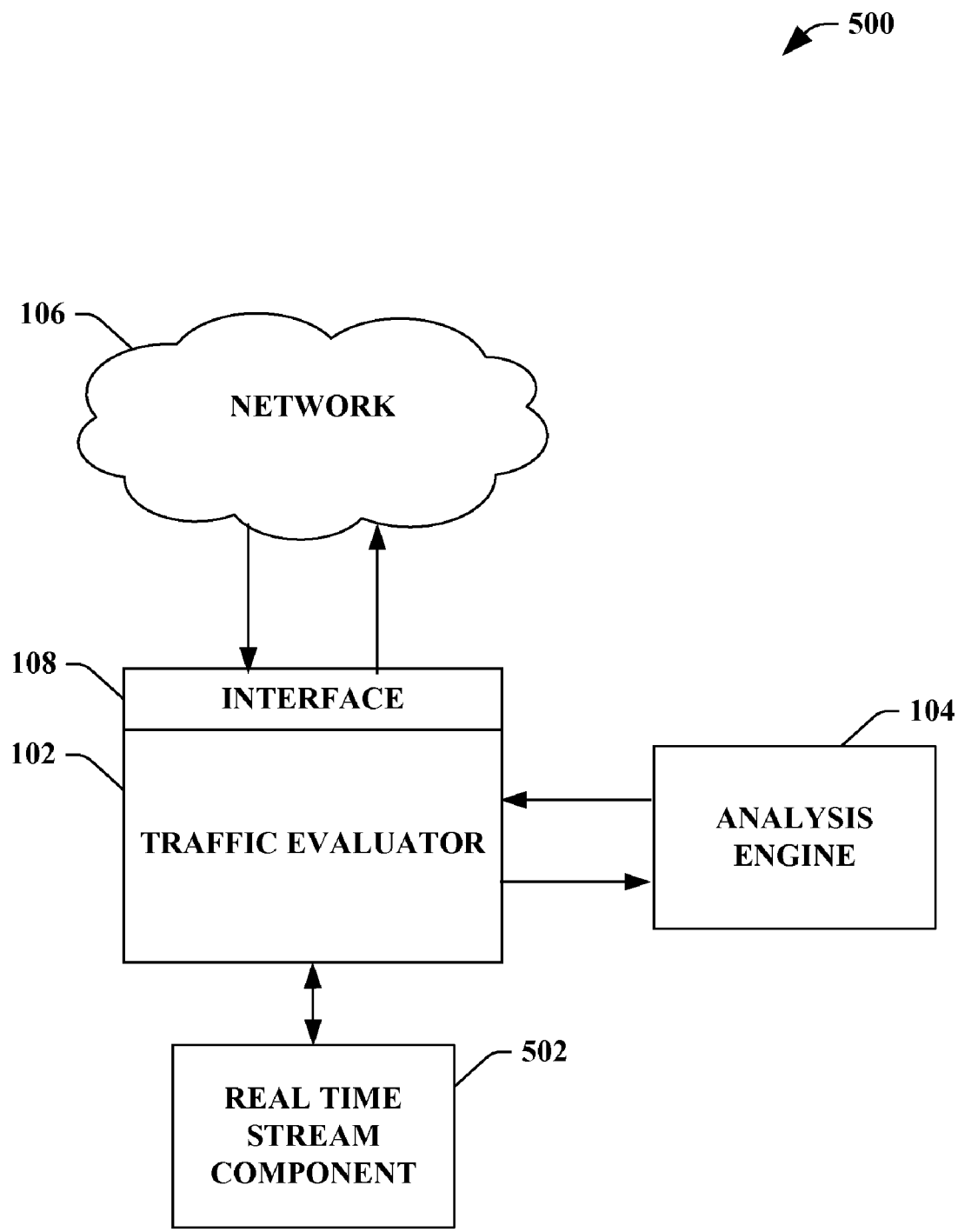
FIG. 5 illustrates a block diagram of exemplary system that facilitates employing dynamic network evaluation by leveraging a communication rule generated from packet timing information.

FIG. 5 illustrates a system 500 that facilitates employing dynamic network evaluation by leveraging a communication rule generated from packet timing information. The system 500 can include a real time stream component 502. The system 500 can be run offline, online, in real time, and/or in any suitable combination. For instance, the packet traces can be provided in real time and the real time stream component 502 can enable dynamic real time creation of communication rules. In another example, the real time stream component 502 can utilize an online technique which can learn rules from packet streams. The real time stream component 502 can compute rows of an activity matrix online, maintain online counters for the currently active flows to determine new, present status and online frequency counters to identify flows that are more prevalent than others, etc.

Figure 6:
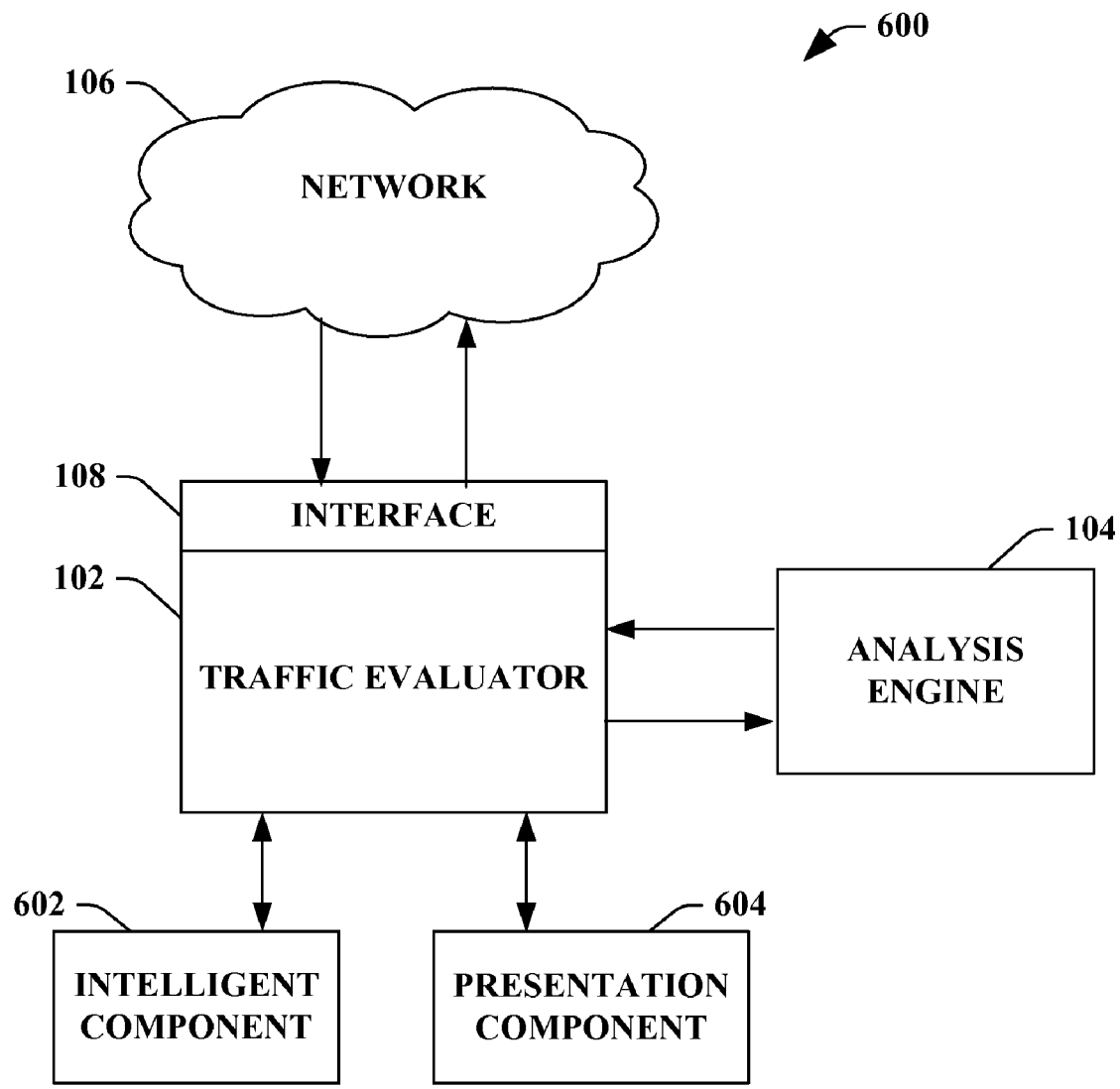
FIG. 6 illustrates a block diagram of an exemplary system that facilitates automatically utilizing communication rules for network management.

FIG. 6 illustrates a system 600 that employs intelligence to facilitate automatically utilizing communication rules for network management. The system 600 can include the traffic evaluator 102, the analysis engine 104, and the network 106, which can be substantially similar to respective evaluators, components, and networks described in previous figures. The system 600 further includes an intelligent component 602. The intelligent component 602 can be utilized by the traffic evaluator 102 to facilitate generating communication rules based upon evaluation of packet trace data, wherein such communication rules can identify traffic within the network 106. For example, the intelligent component 602 can infer communication rules, packet trace data, dependencies, flow pairs, generic rules, activity matrix data, communication rule score and/or rank, generic communication rule score and/or rank, filtering techniques, template data, rule templates, relaxation templates, communication rule extraction, rule graph data, spectrally partition rule graph techniques, real time data, real time management of communication rule creation, etc.

The intelligent component 602 can employ value of information (VOI) computation in order to identify communication rules. For instance, by utilizing VOI computation, the most ideal and/or appropriate communication rules from packet data traces can be determined. Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The traffic evaluator 102 can further utilize a presentation component 604 that provides various types of user interfaces to facilitate interaction between a user and any component coupled to the traffic evaluator 102. As depicted, the presentation component 604 is a separate entity that can be utilized with the traffic evaluator 102. However, it is to be appreciated that the presentation component 604 and/or similar view components can be incorporated into the traffic evaluator 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the traffic evaluator 102.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
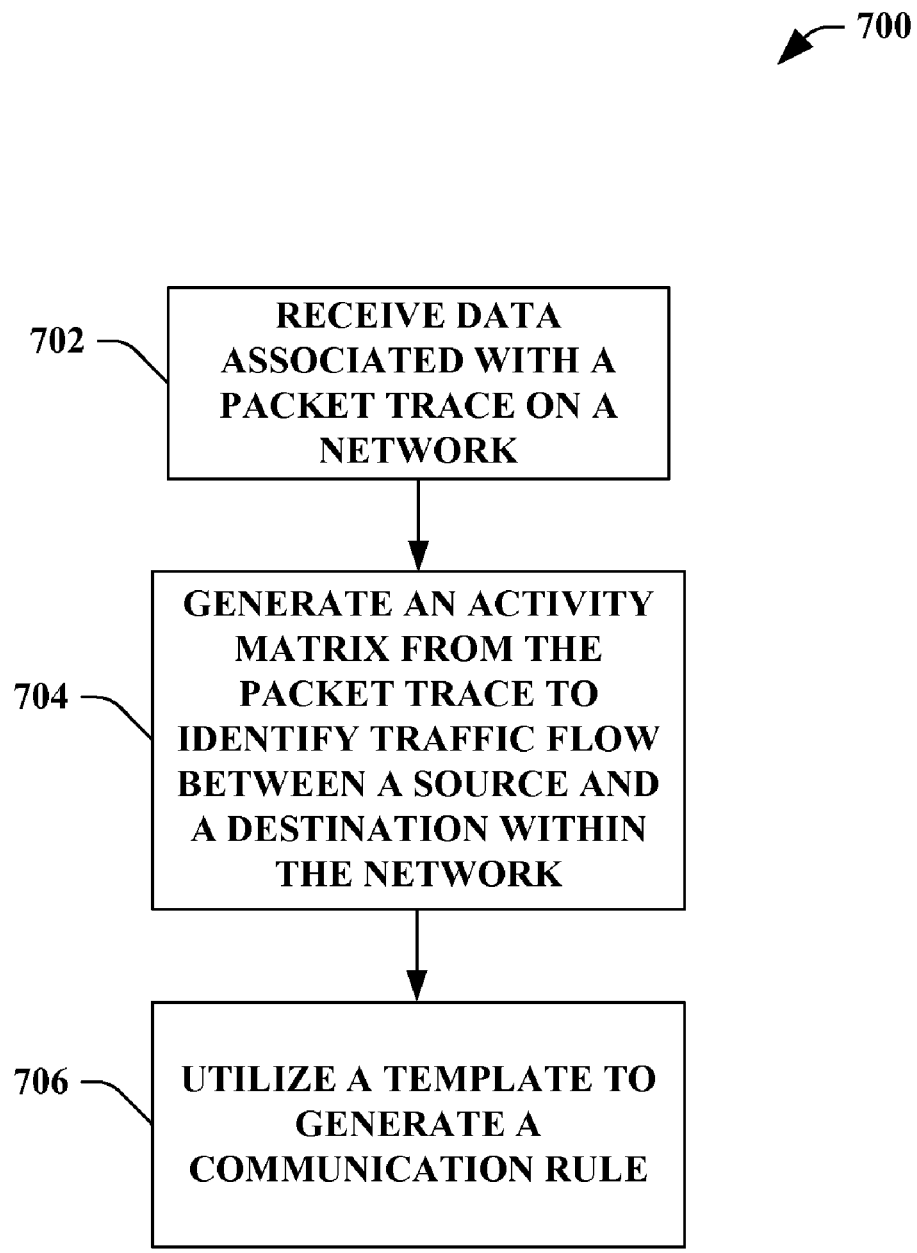
FIG. 7 illustrates an exemplary methodology for identifying underlying rules that govern communications over a network in order to provide network monitoring, diagnosis, and intrusion detection.
Figure 8:
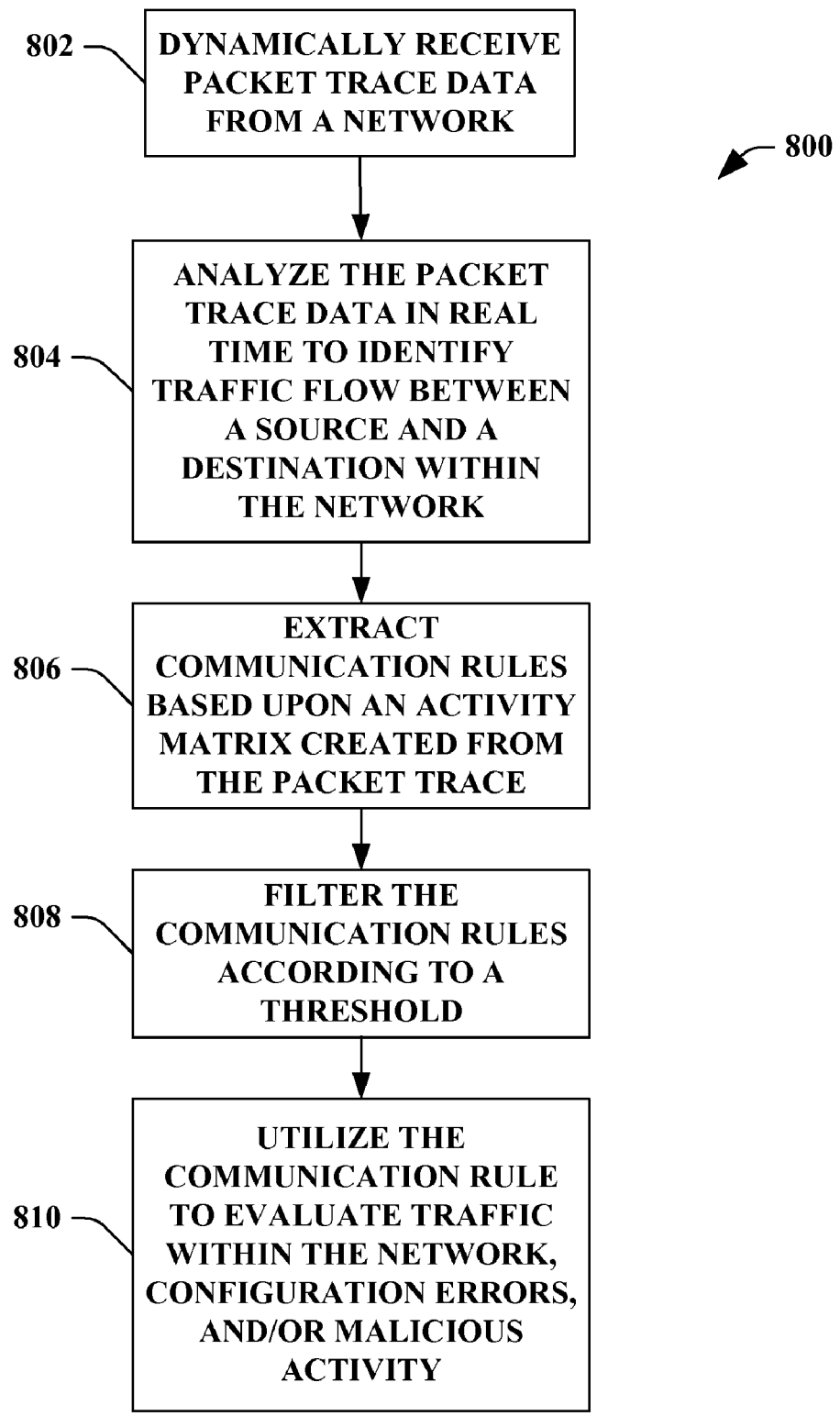
FIG. 8 illustrates an exemplary methodology that facilitates utilizing a packet trace within a network to create a rule to evaluate packet flow and traffic with the network.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates identifying underlying rules that govern communications over a network in order to provide network monitoring, diagnosis, and intrusion detection. At reference numeral 702, data associated with a packet trace on a network can be received. For example, the network can be an enterprise network, an education network, etc. Moreover, the network can include multiple applications, protocols, servers, email applications, web applications, file-server applications, instant messenger applications, planet lab slice applications, multimedia distribution, etc.

At reference numeral 704, an activity matrix can be generated from the packet trace in order to identify traffic flow between a source and a destination within the network. For instance, the source and/or the destination can be an Internet Protocol addresses (IPs), ports, protocols, etc. The activity matrix can include rows denoting time windows in the packet trace and columns corresponding to flows in the trace. A flow is present in a time-window if it sends non-zero packets during that period. For connection-oriented flows like TCP that have an explicit beginning and end (syn, fin), a flow is new in the time window that overlaps its beginning. For datagram-based flows and also when traces that do not have detailed headers, a flow is new if it becomes present after a period of inactivity (e.g., which defaults to no packets in the previous five time windows). Note that if a flow is new, it is also present in that time window (new_present). At reference numeral 706, a template can be utilized to generate a communication rule. In general, the template can be a relaxation template, a ServerBackend template, and/or a client-front-end template.

FIG. 8 illustrates a method 800 for utilizing a packet trace within a network to create a rule to evaluate packet flow and traffic with the network. At reference numeral 802, packet trace data can be dynamically received from a network. At reference numeral 804, the packet trace data can be analyzed in real time in order to identify traffic flow between a source and a destination within the network. At reference numeral 806, communication rules can be extracted based upon an activity matrix created from the packet trace. At reference numeral 808, the communication rules can be filtered in accordance to at least one threshold. At reference numeral 810, the communication rule can be utilized to evaluate at least one of network traffic, configuration errors within the network, and/or malicious activity within the network. It is to be appreciated that the communication rules can be utilized for various network management operations such as, but not limited to, dependency inference, detecting misconfigurations, scans and other anomalies, etc.

Figure 9:
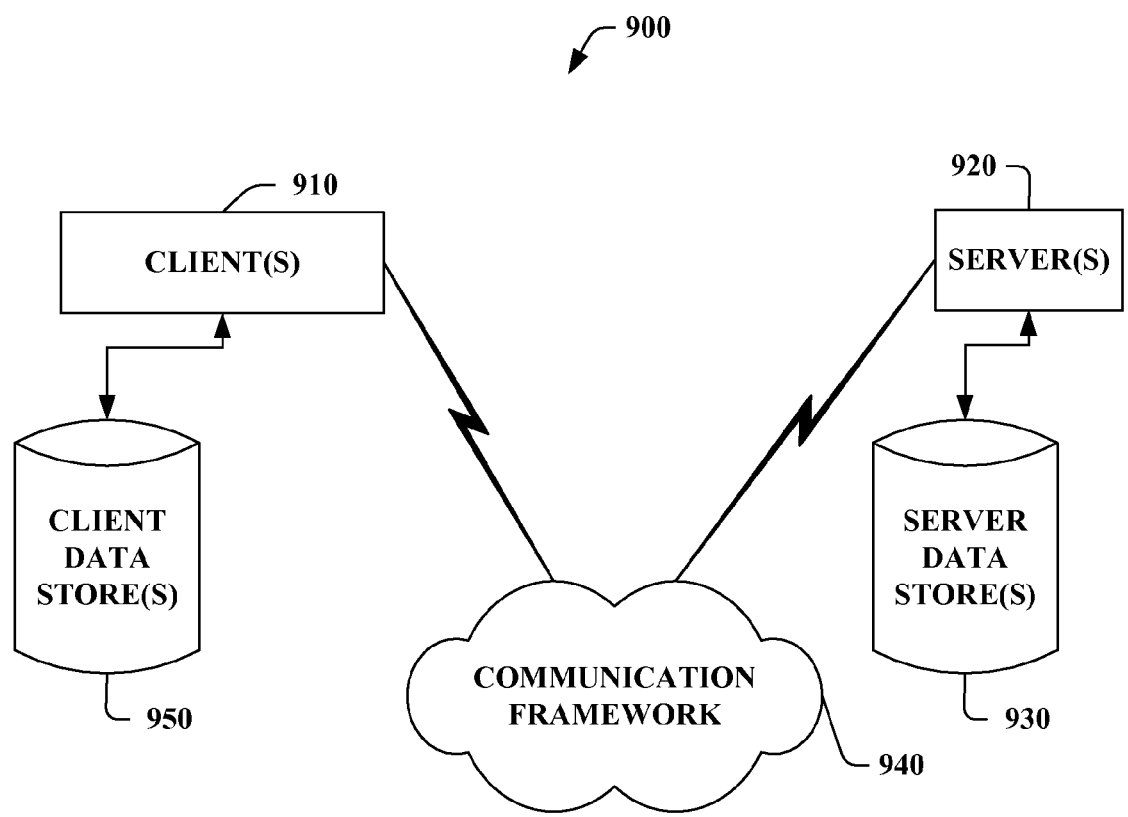
FIG. 9 illustrates an exemplary networking environment, wherein the novel aspects of the claimed subject matter can be employed.
Figure 10:
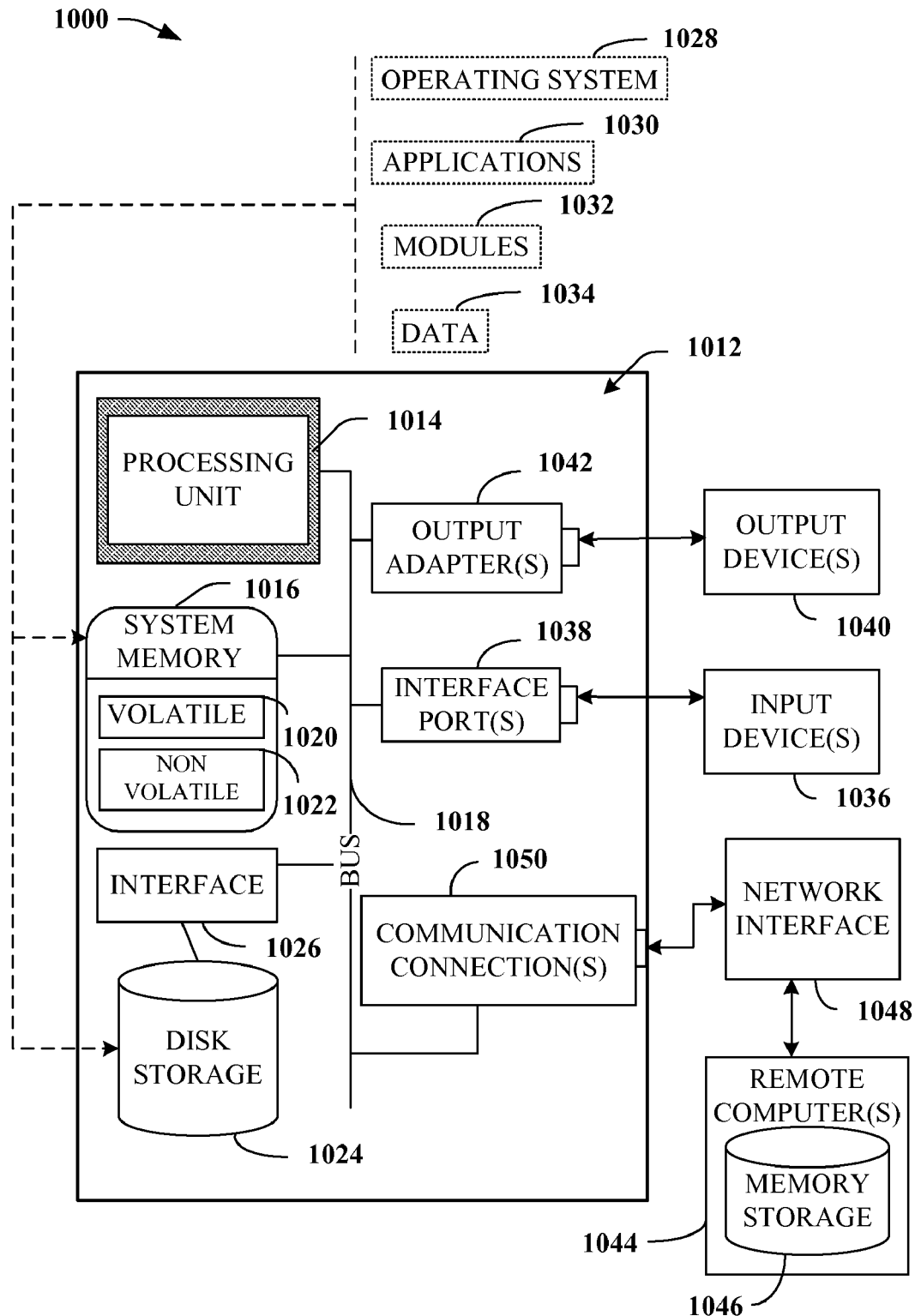
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, a traffic evaluator that can generate communication rules based upon a packet trace for network management (e.g., monitoring, diagnosis, intrusion detection, etc.), as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system that facilitates managing a network by mining communication rules, the system comprising:
   at least one memory;
   at least one processor;
   an analysis engine that looks at a portion of network traffic related to a network in order to obtain timing information, wherein the network includes at least one of a host, a protocol, or an application;
   a traffic evaluator that extracts communication rules for the network, a communication rule being a representation of an underlying dependency between two or more flows as manifested in network traffic and a communication rule being mined by the traffic evaluator to identify such underlying dependency, at least one of the communication rules comprising at least one of a predicted flow or a predicted activity of a flow, at least one of the communication rules comprising a deduction that at least one flow precedes or succeeds at least one or more other flow, and the traffic evaluator leverages the communication rules to provide network management, the network management being at least one of network monitoring, network diagnosis or network intrusion detection; and
   a universal dependency identifier that employs one or more wild cards to relax one or more fields in one or more flows to create generic communication rules, the generic communication rules comprising a subset of the communication rules, at least one of the generic communication rules based upon an identification of a dependency associated with a plurality of sources, or a plurality of applications communicating with one or a plurality of destinations and the one or the plurality of destinations communicating with one or a plurality of other destinations.

2. The system of claim 1, wherein a flow is a communication between a source and a destination within the network, at least one of the source or the destination is at least one of a local Internet Protocol (IP), a local port, a remote IP, a remote port or a protocol.

3. The system of claim 1, at least one of the communication rules for the network is based upon employing a data-mining technique on top of an activity matrix generated from the timing information, the activity matrix includes at least one of a row for a time window of a packet trace, a column for a flow in the packet trace and an entry representing a new, present or absent activity of the flow in the packet trace.

4. The system of claim 1, at least one of the communication rules is related to at least one of normal behavior of applications in the network, a misconfiguration of the network or anomalous/malicious traffic in the network.

5. The system of claim 1, at least one of the communication rules is utilized for at least one of following purposes:
   detecting a configuration error within the network;
   detecting malicious or abnormal activity in the network; or
   providing information related to how applications in the network are functioning.

6. The system of claim 1, further comprising a flow pair component that:
   identifies communication rules based upon a correlation between flow-groups in the network traffic; and
   determines when one or more communication rules has at least one flow-group having independent flows, wherein independent flows comprise flows with no source or destination in common.

7. The system of claim 6, each flow in the flow-groups has activity at least one of present, absent, or new.

8. The system of claim 6, the flow pair component identifies statistically significant dependences for at least one pair of flows by using scoring functions from data-mining, at least one of the scoring functions comprising a JMeasure, the JMeasure identifying a reduction in entropy of at least one communication rule, and modifying the scoring functions to apply for the networking domain.

9. The system of claim 6, the flow pair component uses a scoring function that does at least one of the following:
   scores groups of flows higher that co-occur more frequently;
   scores groups of flows lower that have independent flows;
   scores a group of flows higher as a conditional probability of one flow in the group happening when another flow in the group happens increases;
   encodes directionality in rules;
   corrects a bias towards flows that happen frequently;
   corrects for the negative correlation bias; or
   biases search towards flow groups that are more likely to be relevant.

10. The system of claim 1, the universal dependency identifier creates at least one of the generic communication rules by treating one or more of the following kinds of pluralities as a single group for purposes of correlation:
    one or more ports that may be used by one or more applications;
    one or more source IPs to identify one or more clients to a server; and
    one or more server IPs to identify a functionally similar group of servers, which includes at least one of a set of equivalent DNS servers, Domain Controller servers, WINS servers or a web server cluster.

11. The system of claim 1, the universal dependency identifier utilizes a template to instantiate at least one of the generic communication rules, the template selected from a group consisting of a relaxation template having one or more wild cards to relax one or more fields in one or more flows, a Server-Backend template having one or more wild cards to relax one or more fields in one or more flows associated with a backend dependency of a server and a Client-Frontend template having one or more wild cards to relax one or more fields in one or more flows associated with a frontend dependency of a client.

12. The system of claim 1, further comprising a rule generator that mines network traffic for communication rules, wherein the rule generator computes frequencies for the communication rules based upon counting the flow pairs that are active within a time window in the traffic.

13. The system of claim 1, further comprising a rule generator that utilizes a rule graph that consists of nodes corresponding to both flows and pluralities and includes a directed link between pairs of nodes that are linked by a communication rule; and the traffic evaluator obtains clusters of related rules based at least in part upon a spectral partition of the rule graph, the spectral partition obtained based in part on determining a Laplacian of at least a portion of the rule graph.

14. The system of claim 1, further comprising a real time stream component that provides dynamic and real time evaluation of the timing information to yield communication rules associated with the network in real time.

15. The system of claim 1, further comprising at least one generic communication rule based upon an identification of a dependency associated with a plurality of sources, or a plurality of applications communicating with one or a plurality of destinations and also dependencies associated with a source or application communicating with a plurality of destinations.

16. A computer-implemented method that facilitates managing a network, the method comprising:
    receiving a portion of data associated with one or more packet traces on a network;
    generating an activity matrix from the one or more packet traces to identify activity of traffic flows between sources and destinations within the network;
    employing a data-mining technique on top of the activity matrix;
    determining correlated occurrences between the traffic flows based at least in part on the employing of the data-mining technique;
    analyzing the correlated occurrences to determine underlying dependencies and generic dependencies between the traffic flows;
    utilizing templates that employ one or more wild cards to relax one or more fields in one or more of the traffic flows to abstract away parts of the traffic flows, the templates being defined based at least in part on the generic dependencies; and
    generating communication rules, each communication rule being based on at least one of the templates or at least one of the underlying dependencies.

17. The method of claim 16, further comprising:
    dynamically receiving the portion of data associated with the one or more packet traces in real time;
    determining the correlated occurrences in real time;
    analyzing the correlated occurrences in real time; and
    generating the communication rules in real time.

18. The method of claim 16, further comprising at least one of:
    utilizing at least one of the communication rules to evaluate data packet traffic within the network;
    utilizing at least one of the communication rules to detect a configuration error within the network; and
    utilizing at least one of the communication rules to detect malicious traffic within the network.

19. The method of claim 16, further comprising:
    filtering at least one of the communication rules according to at least one of a threshold, a conditional probability or a support metric for pluralities, the filtering utilizing a scoring function to provide at least one of:
    a scoring of groups of traffic flows higher that co-occur more frequently;
    scoring a group of traffic flows higher as a conditional probability of one traffic flow in the group happening when another traffic flow in the group happens increases;

encoding directionality in rules;
correcting a bias towards traffic flows that happen frequently;
correcting for the negative correlation bias; or
biasing search towards traffic flow groups that are more likely to be relevant;
detecting a configuration error within the network with at least one communication rule;
detecting malicious or abnormal activity in the network with at least one communication rule; and
providing information related to how applications in the network are functioning with at least one communication rule.

20. A computer-implemented method that facilitates managing a network by leveraging data mining, the method comprising:
employing packet traces within a network in order to provide timing information, the network includes at least one of a host, a protocol, or an application;
generating an activity matrix from the timing information, the activity matrix includes at least one of a row for a time window in the packet traces, a column for a flow in the packet traces and an entry representing a new, present or absent activity of the flow in the packet traces;
extracting communication rules for the network, the extracting comprising employing the data mining on the activity matrix for determining dependencies between flows in the packet traces, the determining being based on at least one time window associated with multiple of the flows and each entry representing the new, present or absent activity associated with each of the multiple of the flows, the communication rules comprising a filtered communication rule and a generic communication rule;
filtering at least one of the communication rules to generate the filtered communication rule, the filtered communication rule having a modified significance score based in part on determined dependencies between one or more flows associated with the filtered communication rule;
identifying the generic communication rule based at least in part on the determining dependencies between flows in the packet traces, the generic communication rule employing wild cards to relax one or more fields in one or more corresponding flows between at least one source and at least one destination and the at least one destination and at least one other destination;
utilizing the communication rules to provide information related to data packet traffic within the network;
utilizing the communication rules to detect a configuration error within the network; and
utilizing the communication rules to detect malicious traffic within the network.

* * * * *